US012400295B2

(12) United States Patent
Li et al.

(10) Patent No.: US 12,400,295 B2
(45) Date of Patent: Aug. 26, 2025

(54) IMAGE PROCESSING DEVICE AND METHOD

(71) Applicants: HON HAI PRECISION INDUSTRY CO., LTD., New Taipei (TW); Hongfujin Precision Industry (Shenzhen) Co., Ltd., Guangdong (CN)

(72) Inventors: Yung-Hui Li, New Taipei (TW); Chi-En Huang, New Taipei (TW)

(73) Assignees: HON HAI PRECISION INDUSTRY CO., LTD., New Taipei (TW); Hongfujin Precision Industry (Shenzhen) Co., Ltd., Guangdong (CN)

( * ) Notice: Subject to any disclaimer, the term of this patent is extended or adjusted under 35 U.S.C. 154(b) by 475 days.

(21) Appl. No.: 17/823,963

(22) Filed: Sep. 1, 2022

(65) Prior Publication Data
US 2023/0060988 A1    Mar. 2, 2023

Related U.S. Application Data

(60) Provisional application No. 63/239,423, filed on Sep. 1, 2021.

(51) Int. Cl.
*G06T 3/4053*    (2024.01)
*G06T 3/4046*    (2024.01)
*G06T 3/4076*    (2024.01)

(52) U.S. Cl.
CPC .......... *G06T 3/4053* (2013.01); *G06T 3/4046* (2013.01); *G06T 3/4076* (2013.01)

(58) Field of Classification Search
CPC .... G06T 3/4053; G06T 3/4046; G06T 3/4076
See application file for complete search history.

(56) References Cited

U.S. PATENT DOCUMENTS

| 2016/0171658 | A1  | 6/2016  | Matson et al. |
| 2020/0311871 | A1* | 10/2020 | Yu ............................ G06T 7/10 |
| 2021/0004935 | A1* | 1/2021  | Yao ....................... G06T 3/4084 |
| 2021/0064001 | A1  | 3/2021  | de Beus |

(Continued)

FOREIGN PATENT DOCUMENTS

| CN | 103095977 A | 5/2013 |
| CN | 109816593 A | 5/2019 |

(Continued)

OTHER PUBLICATIONS

J. Wang, Y. Wu, L. Wang, L. Wang, O. Alfarraj and A. Tolba, (2021) "Lightweight Feedback Convolution Neural Network for Remote Sensing Images Super-Resolution," in IEEE Access, vol. 9, pp. 15992-16003 (Year: 2021).*

(Continued)

*Primary Examiner* — Henok Shiferaw
(74) *Attorney, Agent, or Firm* — CKC & Partners Co., LLC (57) ABSTRACT

An image processing device is provided, which includes an image capture circuit and a processor. The image capture circuit is configured to capture a low-resolution image. The processor is connected to the image capture circuit and executes a super-resolution model (SRM), wherein the SRM includes multiple neural network blocks, and the processor is configured to perform the following operations: generating a super-resolution image from the low-resolution image by using the multiple neural network blocks, where one of the multiple neural network blocks includes a spatial attention model (SAM) and a channel attention model (CAM), the CAM is concatenated after the SAM, and the SAM and the CAM are configured to enhance a weight of a region in the super-resolution image, which is covered by a region of interest in the low-resolution image. In addition, an image processing method is also disclosed herein.

20 Claims, 10 Drawing Sheets

(56) References Cited

U.S. PATENT DOCUMENTS

| | | | |
|---|---|---|---|
| 2021/0073945 A1* | 3/2021 | Kim | G06T 3/4053 |
| 2021/0104018 A1* | 4/2021 | Moon | G06T 3/4053 |
| 2021/0133925 A1 | 5/2021 | Lee et al. | |
| 2021/0142148 A1 | 5/2021 | Wang et al. | |
| 2022/0108212 A1 | 4/2022 | Hai et al. | |
| 2022/0286696 A1 | 9/2022 | Gao et al. | |
| 2024/0185386 A1 | 6/2024 | Pan et al. | |

FOREIGN PATENT DOCUMENTS

| | | | | |
|---|---|---|---|---|
| CN | 110175953 A | | 8/2019 | |
| CN | 110717856 A | * | 1/2020 | |
| CN | 110852948 A | * | 2/2020 | G06T 3/4053 |
| CN | 111047515 A | | 4/2020 | |
| CN | 111222466 A | | 6/2020 | |
| CN | 111402137 A | | 7/2020 | |
| CN | 112381020 A | | 2/2021 | |
| CN | 112991173 A | | 6/2021 | |
| TW | 202119295 A | | 5/2021 | |
| TW | I728465 B | | 5/2021 | |
| WO | WO-2020187220 A1 | * | 9/2020 | |
| WO | 2020238558 A1 | | 12/2020 | |

OTHER PUBLICATIONS

T. Dai, H. Zha, Y. Jiang and S. -T. Xia, "Image Super-Resolution via Residual Block Attention Networks", 2019 IEEE/CVF International Conference on Computer Vision Workshop (ICCVW), Seoul, Korea (South), 2019, pp. 3879-3886 (Year: 2019).*

C. Chen, et al., "Learning Spatial Attention for Face Super-Resolution," in IEEE Transactions on Image Processing, vol. 30, pp. 1219-1231, 2021, doi: 10.1109/TIP.2020.3043093. Date of Publication: Dec. 14, 2020. (Year: 2020).

Fan Fan, et al., "Abdominal MRI image multi-scale super-resolution reconstruction based on parallel channel-spatial attention mechanism", Journal of Computer Applications, Dec. 10, 2020, p. 3624-3630, vol. 40, No. 12, China Academic Journal Electronic Publishing House, China.

Jing Chen, "Research on Image Super-resolution Reconstruction Technology Based on Deep Learning", Master's degree thesis, Apr. 2020, Nanjing University of Posts and Telecommunications, China.

Da li Gao, "Research on Airport Runway FOD Detection Algorithm Based on Convolutional Neural Network", Matster's Degree thesis, Jul. 2020, Xidian University, China.

Yueqi Zhong, "Principles, Techniques and Applications of Artificial Intelligence", Sep. 2020, p. 113, Donghua University Press Co., Ltd., China.

Zhihao Fan, et al., "Mask Attention Networks Rethinking and Strengthen Transformer", ARXIV, May 25, 2021, p. 1-10, Cornell University, United States. (https://doi.org/10.48550/arXiv.2103.13597).

Gaopeng Hu, et al., "Image super-resolution reconstruction based on deep progressive back-projection attention network", Journal of Computer Applications, Jul. 10, 2020, p. 2077-2083, vol. 40, No. 7, China Academic Journal Electronic Publishing House, China.

* cited by examiner

IMAGE PROCESSING DEVICE AND METHOD

CROSS-REFERENCE TO RELATED APPLICATION

This application claims priority to U.S. Provisional Application Ser. No. 63/239,423 filed Sep. 1, 2021, the disclosures of which are incorporated herein by reference in their entireties.

BACKGROUND

Field of Disclosure

The present disclosure relates to an image processing technology, and more particularly to an image processing device and method.

Description of Related Art

For current image processing technologies, super-resolution processing is usually performed on images to implement various downstream tasks, for example, to improve the clarity of medical images, biometric effectiveness, or segmentation of self-driving images, etc. Therefore, whether the content of super-resolution images can accurately represent the "critical details required for the downstream tasks" is an important issue in super-resolution processing nowadays.

SUMMARY

One aspect of the present disclosure discloses an image processing device, which includes an image capture circuit and a processor. The image capture circuit is configured to capture a low-resolution image. The processor is connected to the image capture circuit and executes a super-resolution model (SRM), where the SRM includes multiple neural network blocks, and the processor is configured to perform the following operations: generating a super-resolution image from the low-resolution image by using the multiple neural network blocks, where one of the multiple neural network blocks includes a spatial attention model (SAM) and a channel attention model (CAM), the CAM is concatenated after the SAM, and the SAM and the CAM are configured to enhance a weight of a region in the super-resolution image, which is covered by a region of interest in the low-resolution image.

Another aspect of the present disclosure discloses an image processing method, which includes: capturing a low-resolution image, and inputting the low-resolution image to an SRM, where the SRM includes multiple neural network blocks; and generating a super-resolution image from the low-resolution image by using the multiple neural network blocks, where one of the multiple neural network blocks includes an SAM and a CAM, the CAM is concatenated after the SAM, and the SAM and the CAM are configured to enhance a weight of a region in the super-resolution image, which is covered by a region of interest in the low-resolution image.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
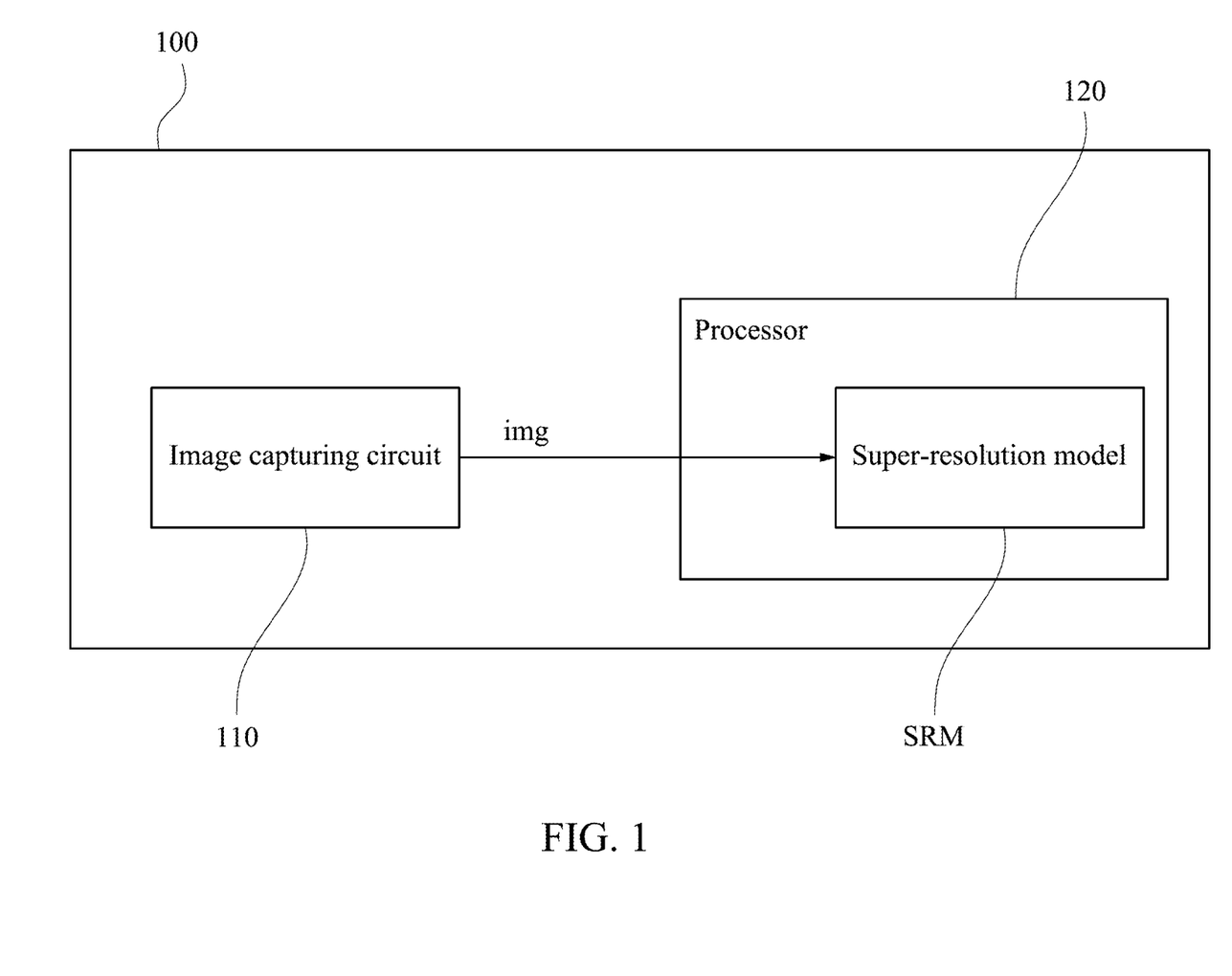
FIG. 1 is a block diagram of an image processing device of the present disclosure.

Referring to FIG. 1, FIG. 1 is a block diagram of an image processing device 100 of the present disclosure. In an embodiment, the image processing device 100 includes an image capture circuit 110 and a processor 120. The image capture circuit 110 is configured to capture a low-resolution image img, and the processor 120 is connected to the image capture circuit 110.

In some embodiments, the image capture circuit 110 can capture a high resolution image and perform a downsampling processing on the high resolution image to capture the low-resolution image img.

In some embodiments, the image processing device 100 can be implemented by using an Internet of Things (IoT) device, a computer, a server, or a data processing center. In some embodiments, the image capture circuit 110 can be a video camera used for capturing images or a camera capable of taking pictures continuously, such as a Digital Single-Lens Reflex Camera (DSLR), a Digital Video Camera (DVC), or a Near-infrared Camera (NIRC). In some embodiments, the processor 120 can be implemented by using a processing unit, a central processing unit, or a computing unit.

In some embodiments, the image processing device 100 includes, but is not limited to, an image capture circuit 110 and a processor 120; and can further include other components required in operations and application. For example, the image processing device 100 can further include an output interface (for example, a display panel used for displaying information), an input interface (for example, a touch panel, keyboard, microphone, scanner, or flash memory reader), and a communication circuit (for example, a WiFi communication model, a Bluetooth communication model, or a wireless telecom network communication model).

As shown in FIG. 1, the processor 120 executes a super-resolution model SRM based on a corresponding software or firmware instruction program. In an embodiment, the super-resolution model SRM can be configured to receive a low-resolution image img, and perform super-resolution processing on the low-resolution image img to generate a super-resolution image (corresponding operations will be described in detail in the following paragraphs), where the degree of resolution of the super-resolution image is higher than that of the low-resolution image img.

In some embodiments, the super-resolution model SRM can be any model capable of executing super-resolution processing, such as a Super-Resolution Convolution Neural Network (SRCNN), a Deep Recursive Convolutional Network (DRCN), a Super-Resolution GAN (SRGAN), a Mask Attention Super-Resolution Generative Adversarial Network (MA-SRGAN), or the like.

In an embodiment, the super-resolution model includes multiple neural network blocks, where one of the multiple neural network blocks includes an spatial attention model and a channel attention model, the channel attention model is concatenated after the spatial attention model, and the spatial attention model and the channel attention model are configured to enhance a weight of a region in the super-resolution image, which is covered by a region of interest in an image (that is, to strengthen areas with dense distribution of important features).

In some embodiments, each neural network block can be formed by combination of network layers such as a convolution layer, a pooling layer, and a fully connected layer. In some embodiments, the spatial attention model and the channel attention model can be concatenated between two convolution layers in the multiple neural network blocks, or contained in the structure of at least one of the neural network blocks.

Figure 2:
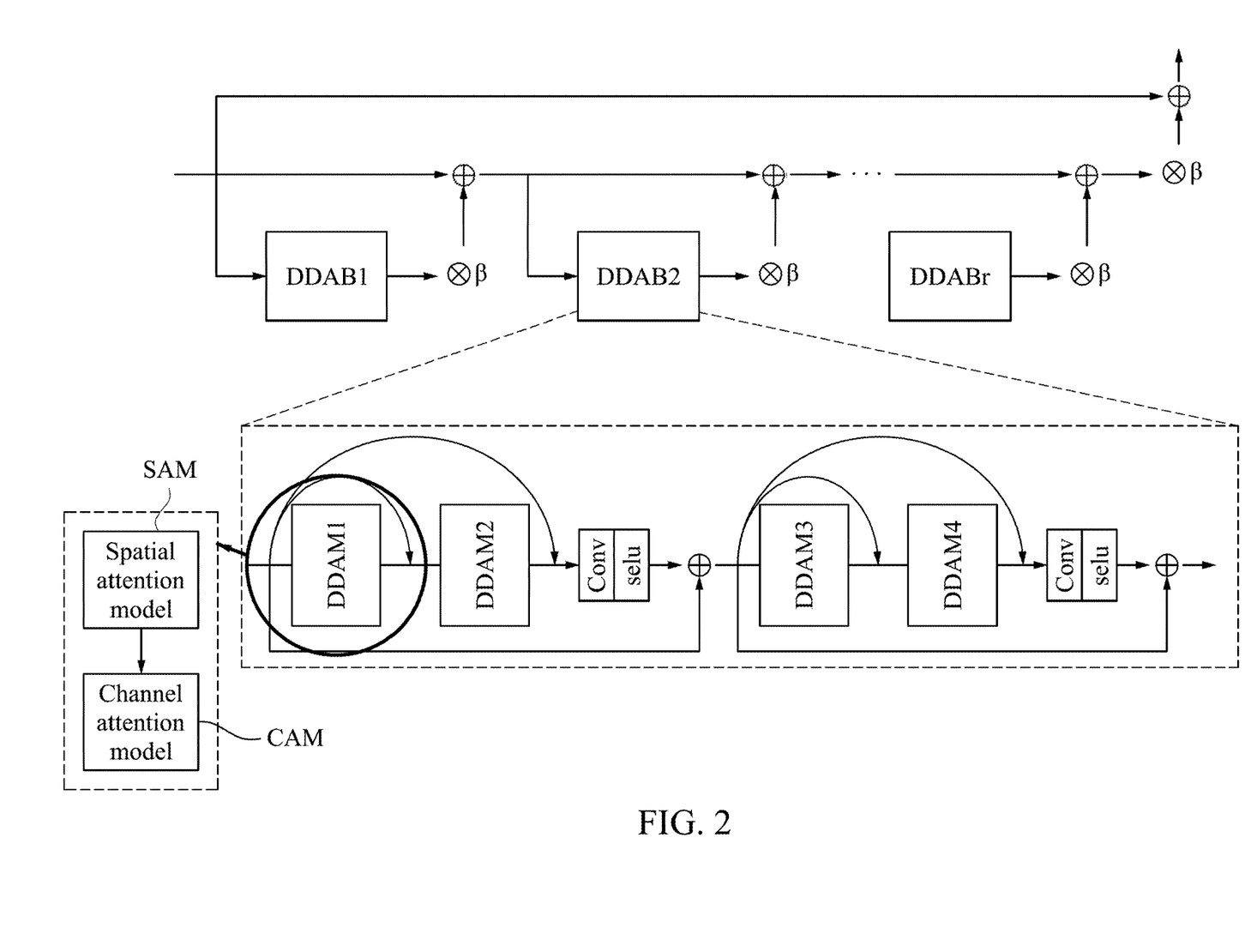
FIG. 2 is a schematic diagram of one of neural network blocks according to some embodiments of the present disclosure.

For example, referring to FIG. 2, FIG. 2 is a schematic diagram of one of the neural network blocks according to some embodiments of the present disclosure. This neural network block includes multiple dual dimensional attention blocks DDAB1 to DDABr, where output feature maps of the dual dimensional attention blocks DDAB1 to DDABr can be multiplied by a parameter β (0≤parameter β≤1), and r can be any positive integer. Further, the dual dimensional attention block DDAB2 can be formed by combination of dual dimensional attention models DDAM1 to DDAM4 and two convolution layers Cony with a Scaled Exponential Linear Unit (selu) as the activation function in a concatenation manner shown in FIG. 2. It should be noted that, the dual dimensional attention blocks DDAB1, and DDAB3 to DDABr can also have the same structure. Further, the dual dimensional attention model DDAM1 can include a spatial attention model SAM and a channel attention model CAM, where the channel attention model CAM is connected after the spatial attention model SAM. It should be noted that, the dual dimensional attention models DDAM2 to DDAM4 can also have the same structure.

By means of the foregoing spatial attention model SAM and channel attention model CAM, the weight of a region in the super-resolution image, which is covered by a region of interest in the low-resolution image can be further enhanced, so as to improve the effect of super-resolution processing for pixels of the region of interest in the image. Detailed steps executed by the spatial attention model SAM and the channel attention model CAM in some embodiments will be further described below with reference to specific examples.

Figure 3:
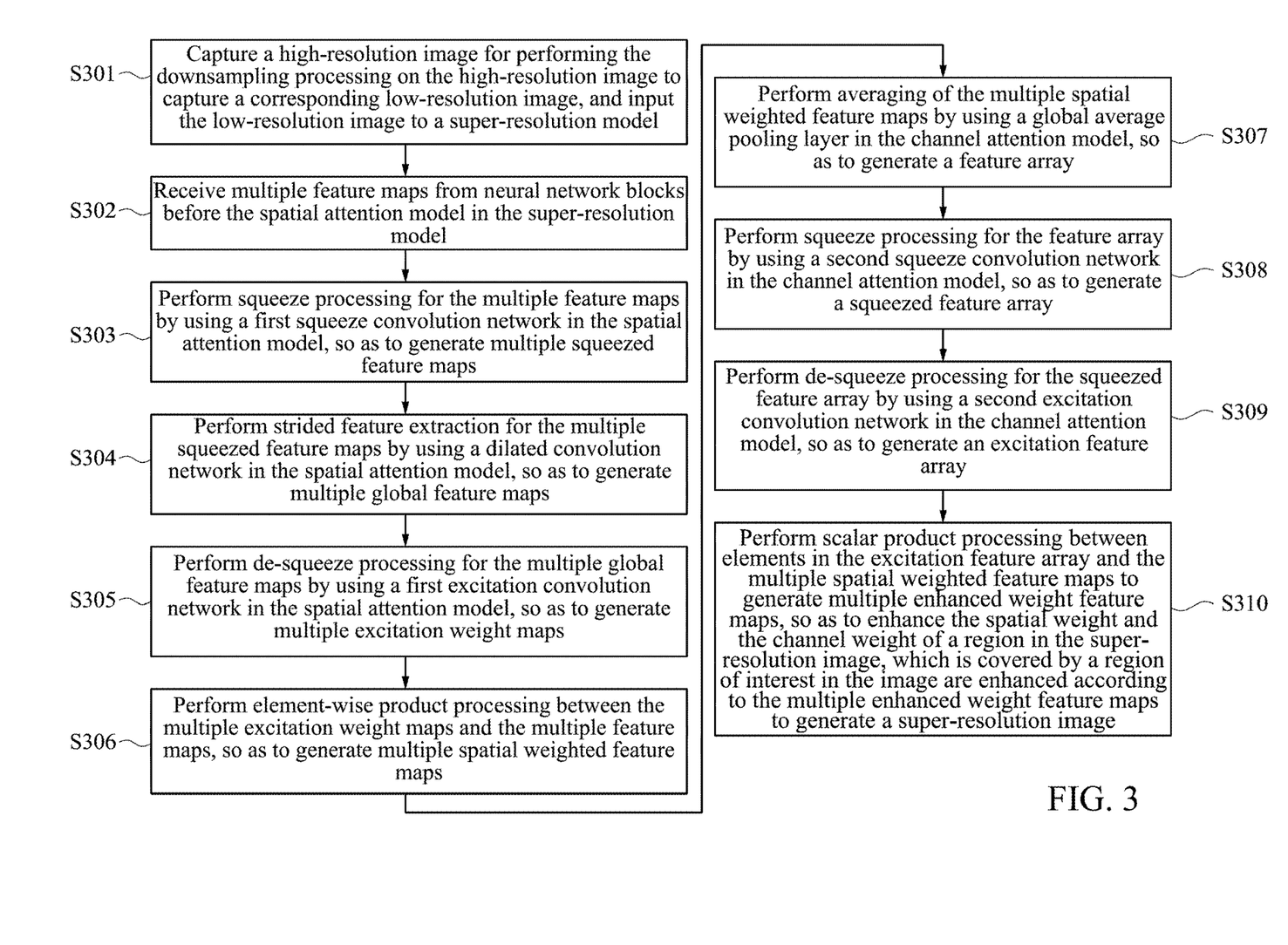
FIG. 3 is a flowchart of an image processing method according to some embodiments of the present disclosure.

Referring to FIG. 3, FIG. 3 is a flowchart of an image processing method according to some embodiments of the present disclosure. The method in the embodiment shown by FIG. 3 is applicable to the image processing device 100 in FIG. 1, but the present disclosure is not limited thereto. For convenience and clarity, referring to FIGS. 1 and 3 together below, detailed steps of the image processing method shown in FIG. 3 are described according to an operational relationship between components in the image processing device 100.

In an embodiment, the image processing method includes steps S301 to S310. First, in step S301, a high-resolution image is captured for performing the downsampling processing on the high-resolution image to capture a corresponding low-resolution image img, and the low-resolution image img is input to a super-resolution model SRM.

In some embodiments, initial values of parameters for the super-resolution model SRM can be average values obtained from the past training experience or manually given preset values.

Further, in step S302, multiple feature maps are received from neural network blocks before the spatial attention model in the super-resolution model SRM.

In some embodiments, in the SRM, all the neural network blocks before the spatial attention model can be multiple convolution layers which can perform convolution processing for the low-resolution image img so as to generate multiple feature maps.

Then, in step S303, squeeze processing is performed for the multiple feature maps by using a first squeeze convolution network in the spatial attention model, so as to generate multiple squeezed feature maps.

In some embodiments, convolution processing can be performed for the multiple feature maps by using multiple kernel maps corresponding to the first squeeze convolution network, so as to generate multiple convolution images (i.e. intermediate feature map), where the number of the convolution images is less than that of the multiple feature maps. Afterwards, corresponding-element non-linear transformation processing is performed for the multiple convolution images according to a corresponding relationship between the multiple kernel maps and the multiple convolution images, so as to generate multiple squeezed feature maps (that is, non-linear transformation processing is performed for a sum of elements in the same position in all the convolution images corresponding to the kernel maps, so as to generate the squeezed feature maps respectively corresponding to these kernel maps), where the multiple squeezed feature maps are respectively corresponding to the multiple kernel maps. In other words, because the number of the kernel maps of the first squeeze convolution network is less than that of the input feature maps, the number of squeezed feature maps output after completion of the convolution operation is less than the number of the input feature maps, thereby greatly reducing resources required for overall calculation.

In some embodiments, the non-linear transformation processing is performed on the summation of the same position in the multiple convolution images according to a corresponding relationship.

In some embodiments, the corresponding-element non-linear transformation processing can be selu function processing, Rectified Linear Unit (ReLU) function processing, tanh function processing, Parametric Rectified Linear Unit (PreLU) function processing, or a combination of the foregoing function processing.

Further, in step S304, strided feature extraction is performed for the multiple squeezed feature maps by using a dilated convolution network in the spatial attention model, so as to generate multiple global feature maps.

In some embodiments, the strided feature extraction can be performed for the multiple squeezed feature maps by using the dilated convolution network according to a preset dilation rate. In some embodiments, the strided feature extraction can be performed for the multiple squeezed feature maps for many times (for example, twice) by using the dilated convolution network, where the multiple strided feature extraction operations respectively corresponds to multiple different kernel maps with the same or different dilation rates.

It should be noted that, the dilated convolution can increase the field of perception around each pixel point of the squeezed feature map, so that global features can be acquired in a wider range. In this way, the inference results of the neural network can be significantly improved, thus avoiding a problem of perception field overlapping during learning of the neural network.

Further, in step S305, de-squeeze processing is performed for the multiple global feature maps by using a first excitation convolution network in the spatial attention model, so as to generate multiple excitation weight maps, where the number of the excitation weight maps is greater than that of the multiple feature maps.

In some embodiments, convolution processing can be performed for the multiple global feature maps by using the multiple kernel maps corresponding to the first excitation convolution network, so as to generate multiple convolution images, where the number of the multiple kernel maps is greater than that of the multiple global feature maps. Afterwards, corresponding-element normalization processing is performed for the multiple convolution images according to a corresponding relationship between the multiple kernel maps and the multiple convolution images, so as to generate multiple excitation weight maps, where the multiple excitation weight maps are respectively corresponding to the multiple kernel maps.

In some embodiments, the corresponding-element normalization processing can be sigmoid function processing.

Further, in step S306, element-wise product processing is performed between the multiple excitation weight maps and the multiple feature maps, so as to generate multiple spatial weighted feature maps.

In some embodiments, element-wise product processing can be performed between elements in the multiple excitation weight maps and elements in the respectively corresponding feature maps, so as to generate multiple spatial weighted feature maps. Thus, the spatial weight of the region of interest in the super-resolution image can be enhanced by means of the multiple spatial weighted feature maps.

Further, in step S307, averaging of the multiple spatial weighted feature maps is performed by using a global average pooling layer (GAPL) in the channel attention model, so as to generate a feature array.

In some embodiments, all elements in each spatial weighted feature map are added, and then an average value is calculated as the representative feature of the corresponding feature map, thus further forming a feature array.

Further, in step S308, squeeze processing is performed for the feature array by using a second squeeze convolution network in the channel attention model, so as to generate a squeezed feature array, where the size of the squeezed feature array is less than that of the feature array.

In some embodiments, convolution processing can be performed for the feature array by using the multiple kernel maps (each with a size of 1×1) corresponding to the second squeeze convolution network, so as to generate multiple convolution arrays, where the number of the multiple kernel maps is less than that of elements in the feature array. Afterwards, corresponding-element non-linear transformation processing is performed for the multiple convolution arrays according to a corresponding relationship between the multiple kernel maps and the multiple convolution arrays, so as to generate a squeezed feature array, where elements in the squeezed feature array respectively correspond to the multiple kernel maps.

Further, in step S309, de-squeeze processing is performed for the squeezed feature array by using a second excitation convolution network in the channel attention model, so as to generate an excitation feature array.

In some embodiments, convolution processing can be performed for the squeezed feature array by using multiple kernel maps corresponding to the second excitation convolution network, so as to generate multiple convolution arrays, where the number of the multiple kernel maps is greater than the number of elements in the squeezed feature array and is equal to the number of the multiple spatial weighted feature maps. Afterwards, corresponding-element normalization processing can be performed for the multiple convolution arrays according to a corresponding relationship between the multiple kernel maps and the multiple convolution arrays, so as to generate an excitation feature array, where elements in the excitation feature array respectively correspond to the multiple kernel maps. In detail, element-wise product processing can be performed for elements in the feature array by using the kernel maps, so as to generate a convolution array corresponding to each kernel map; and corresponding-element normalization is further performed for the elements in the convolution arrays corresponding to these kernel maps in the multiple convolution arrays, so as to generate an excitation feature array corresponding to each kernel map.

Further, in step S310, scalar product processing is performed between elements in the excitation feature array and the multiple spatial weighted feature maps, so as to generate multiple enhanced weight feature maps. Then, the spatial weight and the channel weight of a region in the super-resolution image, which is covered by a region of interest in the image are enhanced according to the multiple enhanced weight feature maps, so as to generate the super-resolution image, where the number of the elements in the excitation feature array is equal to the number of the multiple enhanced weight feature maps.

In some embodiments, the generated multiple enhanced weight feature maps can be input to the neural network blocks concatenated after the channel attention model, for subsequent training (a training phase) or super-resolution processing (a test phase). In some embodiment, the neural network blocks concatenated after the channel attention model can be an upsampling layer.

In detail, in the training phase, the high-resolution image can be input to the image capture circuit 110 to generate and capture the the low-resolution image img by performing the downsampling processing, the low-resolution image img and a preset high-resolution image corresponding to the low-resolution image img can be input to the super-resolution model SRM, and the super-resolution model SRM performs the above-mentioned steps S301-S310, thereby training the super-resolution model SRM. In other words, in the training phase, the downsampling processing is performed on the high-resolution image to generate the low-resolution image img firstly, and then the low-resolution image img is input to the super-resolution model SRM so as to train the super-resolution model SRM.

In this way, in the testing phase, the low-resolution image img (or another low-resolution image) can be input to the trained super-resolution model SRM, and the trained super-resolution model SRM can output the super-resolution image. In other words, in the test phase, the low-resolution image img is input to the trained super-resolution model SRM directly so as to output the super-resolution image from the trained super-resolution model SRM.

By means of the foregoing steps, the image processing device 100 can enhance the spatial weight and the channel weight of a region in the super-resolution image, which is covered by a region of interest in the low-resolution image img according to the multiple enhanced weight feature maps generated by the spatial attention model and the channel attention model. Thus, critical details required for the downstream tasks can be accurately presented (that is, there is a stronger super-resolution processing effect on areas with dense features in the low-resolution image img).

Specific examples regarding the spatial attention model and the channel attention model are given below.

Figure 4:
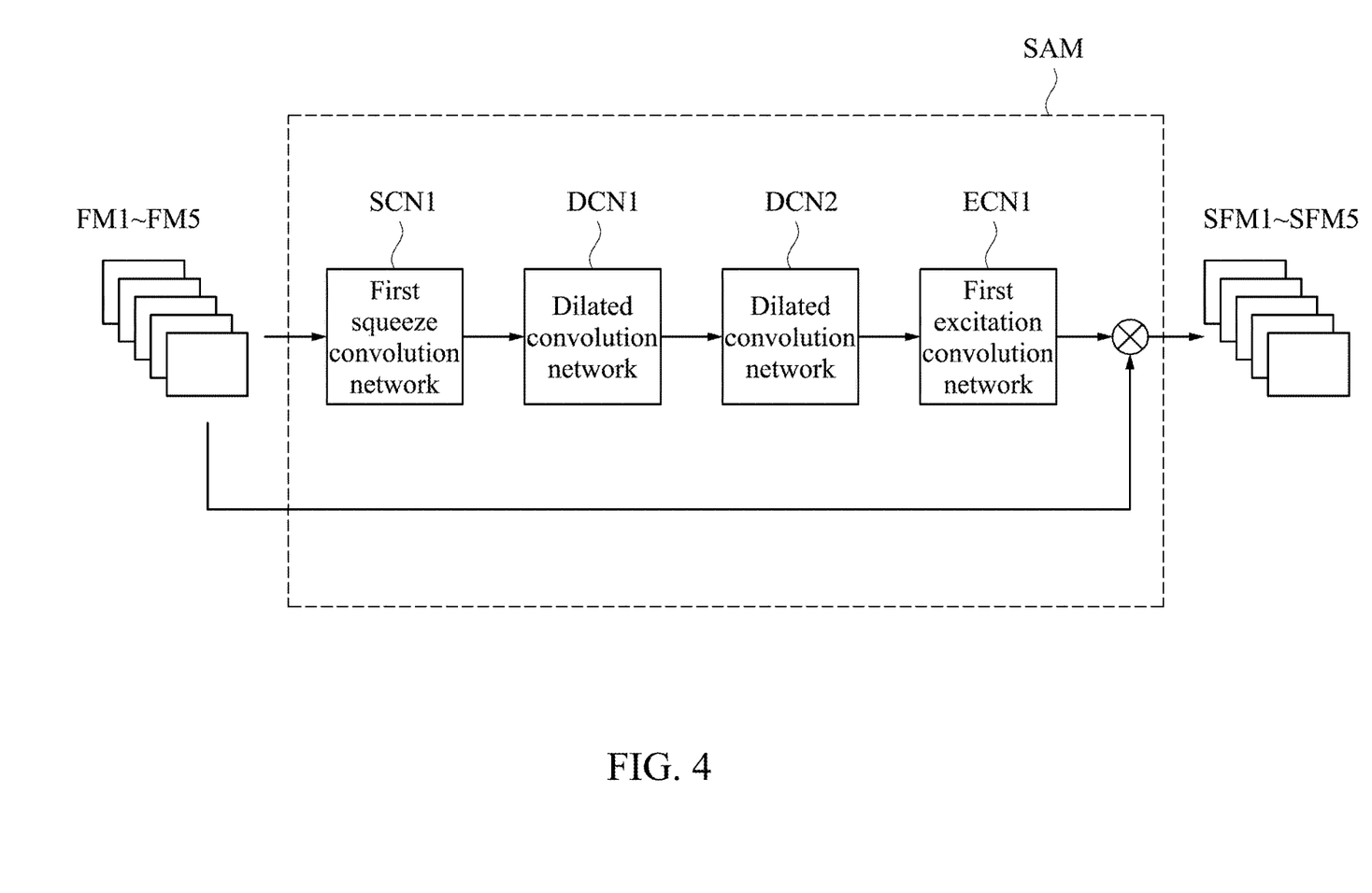
FIG. 4 is a schematic diagram of a spatial attention model according to some embodiments of the present disclosure.

Referring to FIG. 4, FIG. 4 is a schematic diagram of a spatial attention model SAM according to some embodiments of the present disclosure. The spatial attention model SAM includes a first squeeze convolution network SCN1, dilated convolution networks DCN1 and DCN2, and a first excitation convolution network ECN1. It is assumed that the spatial attention model SAM can receive five feature maps FM1 to FM5 from the neural network blocks in the previous layer, and can input the feature maps FM1 to FM5 to the first squeeze convolution network SCN1.

Figure 5:
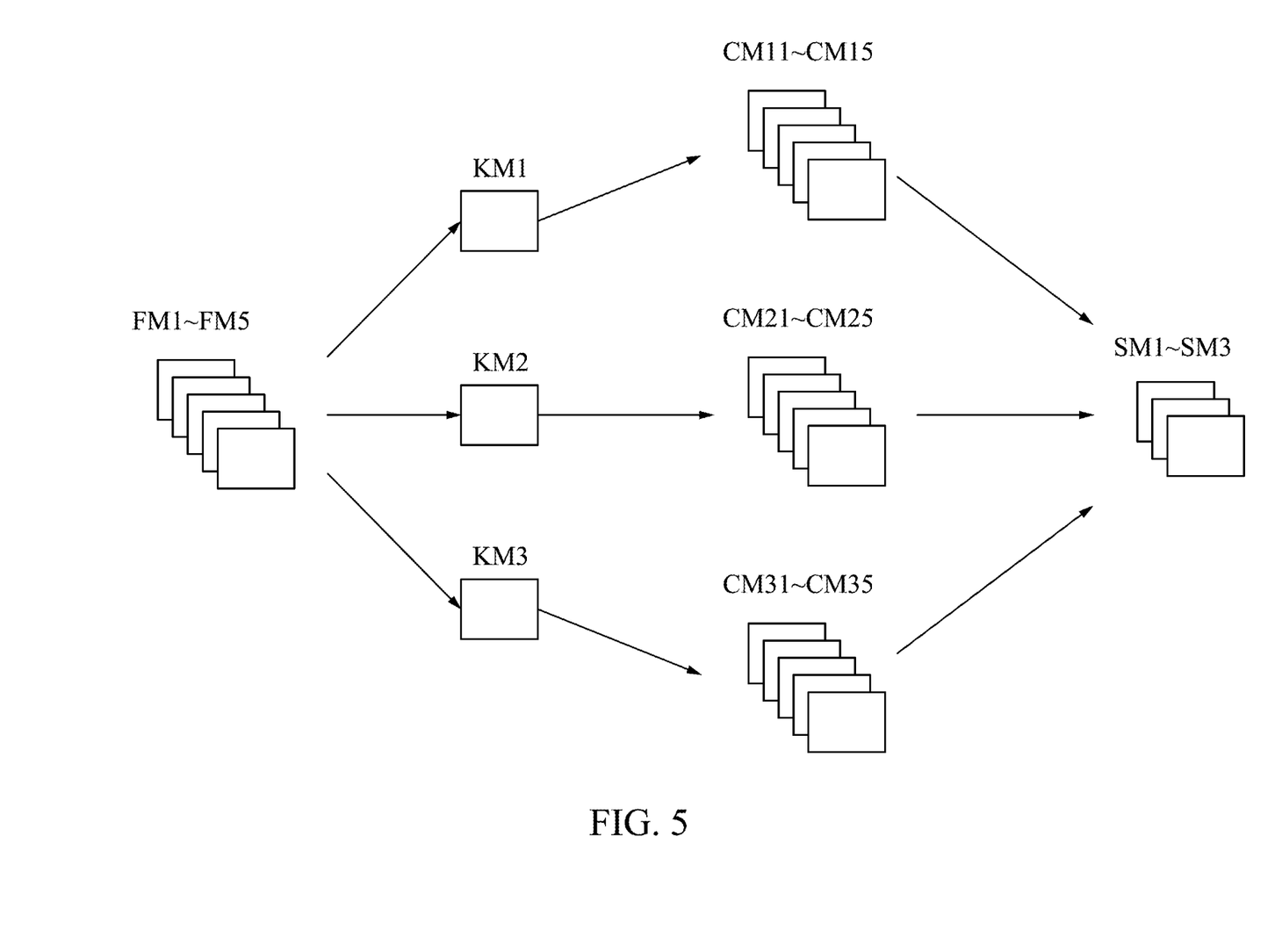
FIG. 5 is a schematic diagram of executing a first squeeze convolution network according to some embodiments of the present disclosure.

Further referring to FIG. 5, FIG. 5 is a schematic diagram of executing the first squeeze convolution network SCN1 according to some embodiments of the present disclosure. In FIG. 5, convolution processing can be performed for the feature maps FM1 to FM5 separately by using three kernel maps KM1 to KM3, so as to generate convolution images CM11 to CM15, CM21 to CM25, and CM31 to CM35, respectively.

Afterwards, corresponding-element non-linear transformation processing can be performed for the convolution images CM11 to CM15, so as to generate a squeezed feature map SM1 (for example, the selu function processing is performed for a sum of elements in the same position in the convolution images CM11 to CM15, so as to generate the squeezed feature map SM1 according to the processed elements); corresponding-element non-linear transformation processing can be performed for the convolution images CM21 to CM25, so as to generate a squeezed feature map SM2; and corresponding-element non-linear transformation processing can be performed for the convolution images CM31 to CM35, so as to generate a squeezed feature map SM3. Thus, the squeezed feature maps SM1 to SM3 can be input to the dilated convolution network DCN1, and the strided feature extraction is performed for the first time so as to input generated intermediate global feature maps to the dilated convolution network DCN2; and then the strided feature extraction is performed for the second time to generate the multiple generated global feature maps so as to input the multiple generated global feature maps to the first excitation convolution network ECN1.

Figure 6:
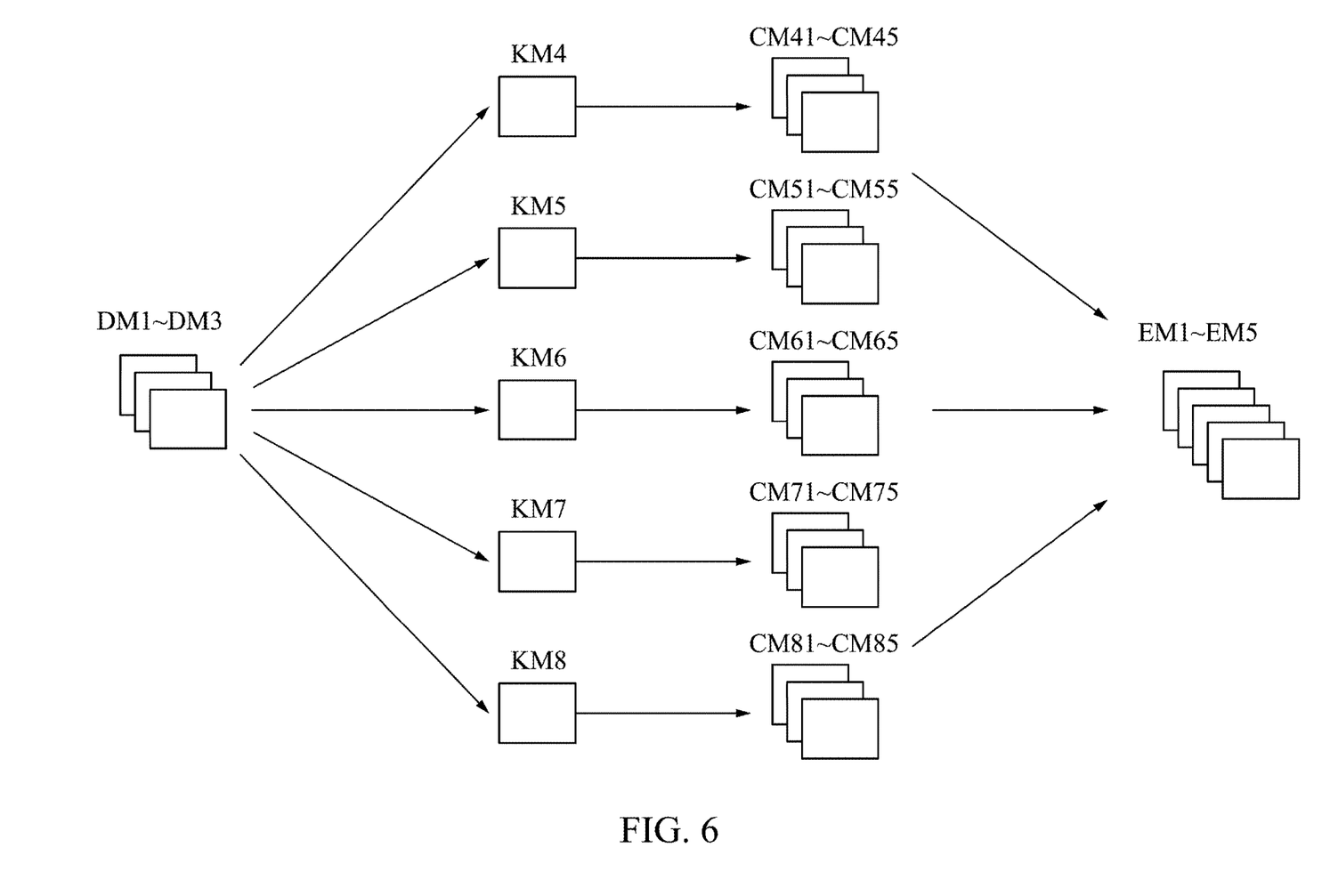
FIG. 6 is a schematic diagram of executing a first excitation convolution network according to some embodiments of the present disclosure.

Further referring to FIG. 6, FIG. 6 is a schematic diagram of executing the first excitation convolution network ECN1 according to some embodiments of the present disclosure. In FIG. 6, the first excitation convolution network ECN1 can receive three global feature maps DM1 to DM3 from the dilated convolution network DCN2. Afterwards, convolution processing can be performed for the global feature maps DM1 to DM3 separately by using five kernel maps KM4 to KM8, so as to generate convolution images CM41 to CM43, CM51 to CM53, CM61 to CM63, CM71 to CM73, and CM81 to CM83.

Afterwards, corresponding-element normalization processing can be performed for the convolution images CM41 to CM43 so as to generate an excitation weight map EM1 (for example, sigmoid function processing is performed for a sum of elements in the same position in the convolution images CM41 to CM43, so as to generate the excitation weight map EM1 according to the processed elements); corresponding-element normalization processing can be performed for the convolution images CM51 to CM53, so as to generate an excitation weight map EM2; corresponding-element normalization processing can be performed for the convolution images CM61 to CM63, so as to generate an excitation weight map EM3; corresponding-element normalization processing can be performed for the convolution images CM71 to CM73, so as to generate an excitation weight map EM4; and corresponding-element normalization processing can be performed for the convolution images CM81 to CM83, so as to generate an excitation weight map EM5.

Thus, element-wise product processing (namely, multiplying elements in the same position) can performed between the excitation weight maps EM1 to EM5 and the feature maps FM1 to FM5, so as to generate multiple spatial weighted feature maps SFM1 to SFM5; and then the spatial weighted feature maps SFM1 to SFM5 are input to the channel attention model concatenated after the spatial attention model.

Figure 7:
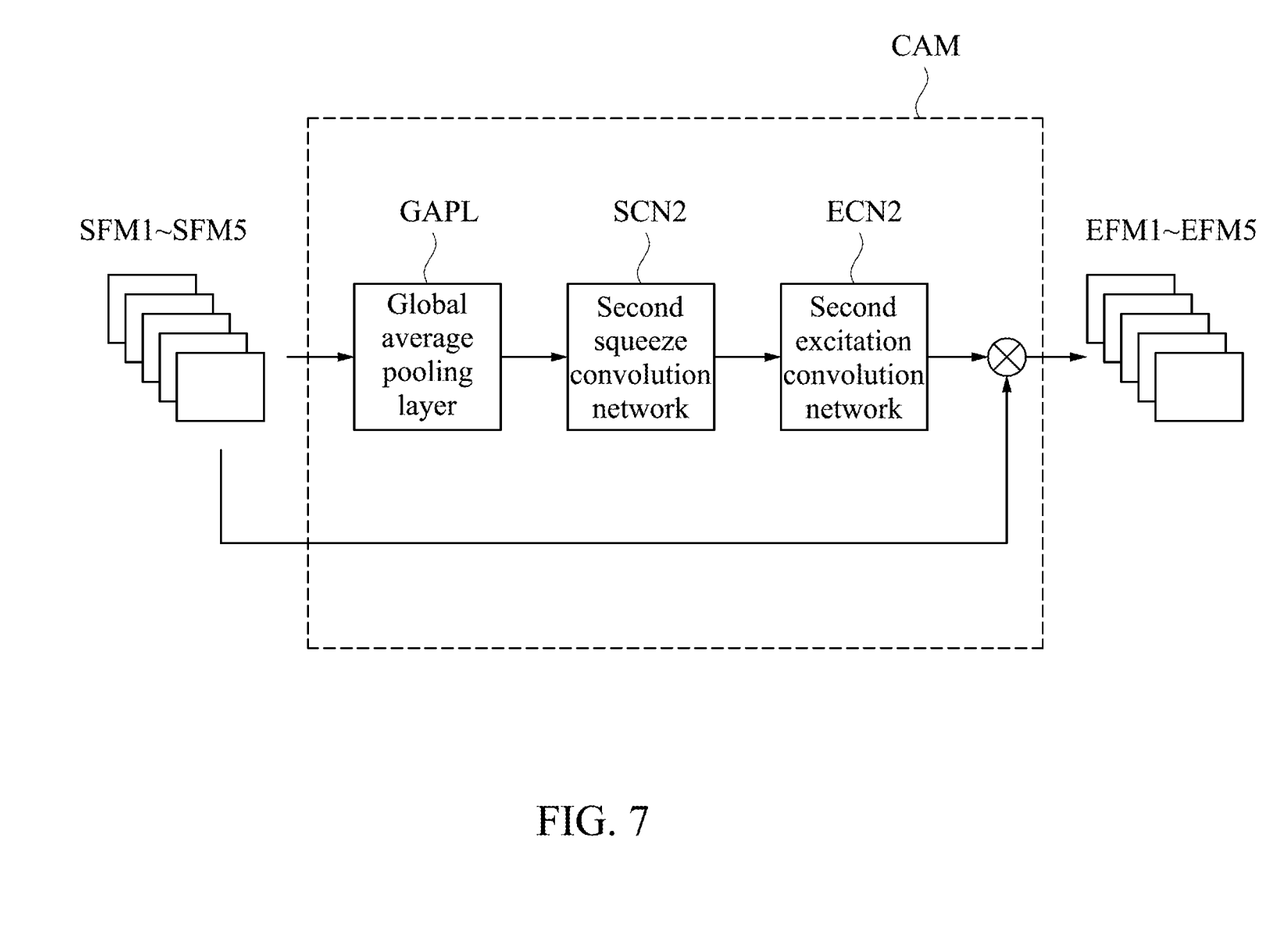
FIG. 7 is a schematic diagram of a channel attention model according to some embodiments of the present disclosure.

Referring to FIG. 7, FIG. 7 is a schematic diagram of a channel attention model CAM according to some embodiments of the present disclosure, where the channel attention model CAM includes a GAPL, a second squeeze convolution network SCN2, and a second excitation convolution network ECN2. The channel attention model CAM can receive the spatial weighted feature maps SFM1 to SFM5 from the spatial attention model in the previous layer, and then input the spatial weighted feature maps SFM1 to SFM5 to the GAPL.

Afterwards, in the GAPL, an average value (namely, an average value of all elements in each spatial weighted feature map) of elements in each of the spatial weighted feature maps SFM1 to SFM5 is calculated, and these average values are used as elements of a feature array (multiple elements in the feature array respectively correspond to the spatial weighted feature maps SFM1 to SFM5). Thus, the feature array can be input to the second squeeze convolution network SCN2.

Figure 8:
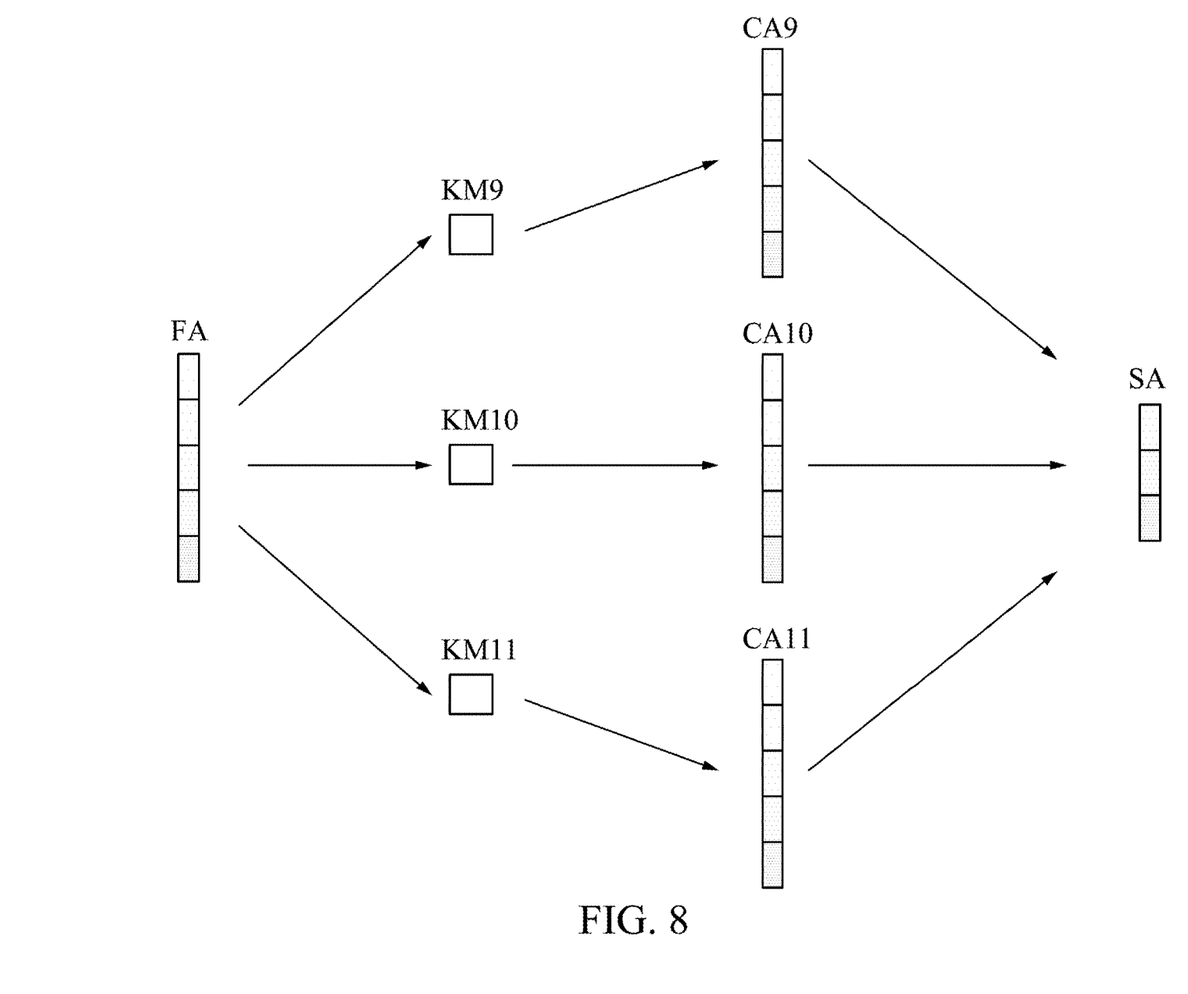
FIG. 8 is a schematic diagram of executing a second squeeze convolution network according to some embodiments of the present disclosure.

Further referring to FIG. 8, FIG. 8 is a schematic diagram of executing the second squeeze convolution network SCN2 according to some embodiments of the present disclosure. In FIG. 8, convolution processing can be performed for the feature array FA by separately using three kernel maps KM9 to KM11 each with a size of 1×1, so as to generate convolution arrays CA9 to CA11 (for example, the elements in the feature array FA are separately multiplied by the kernel map KM9 so as to generate a convolution array CA9).

Afterwards, corresponding-element non-linear transformation processing can be performed for the convolution arrays CA9 to CA11 so as to generate a squeezed feature array SA (for example, the selu function processing is performed for a sum of elements in the same convolution array, and resulting values corresponding to CA9 to CA11 respectively are concatenated, so as to generate the squeezed feature array SA). Thus, the squeezed feature array SA can be input to the second excitation convolution network ECN2.

Figure 9:
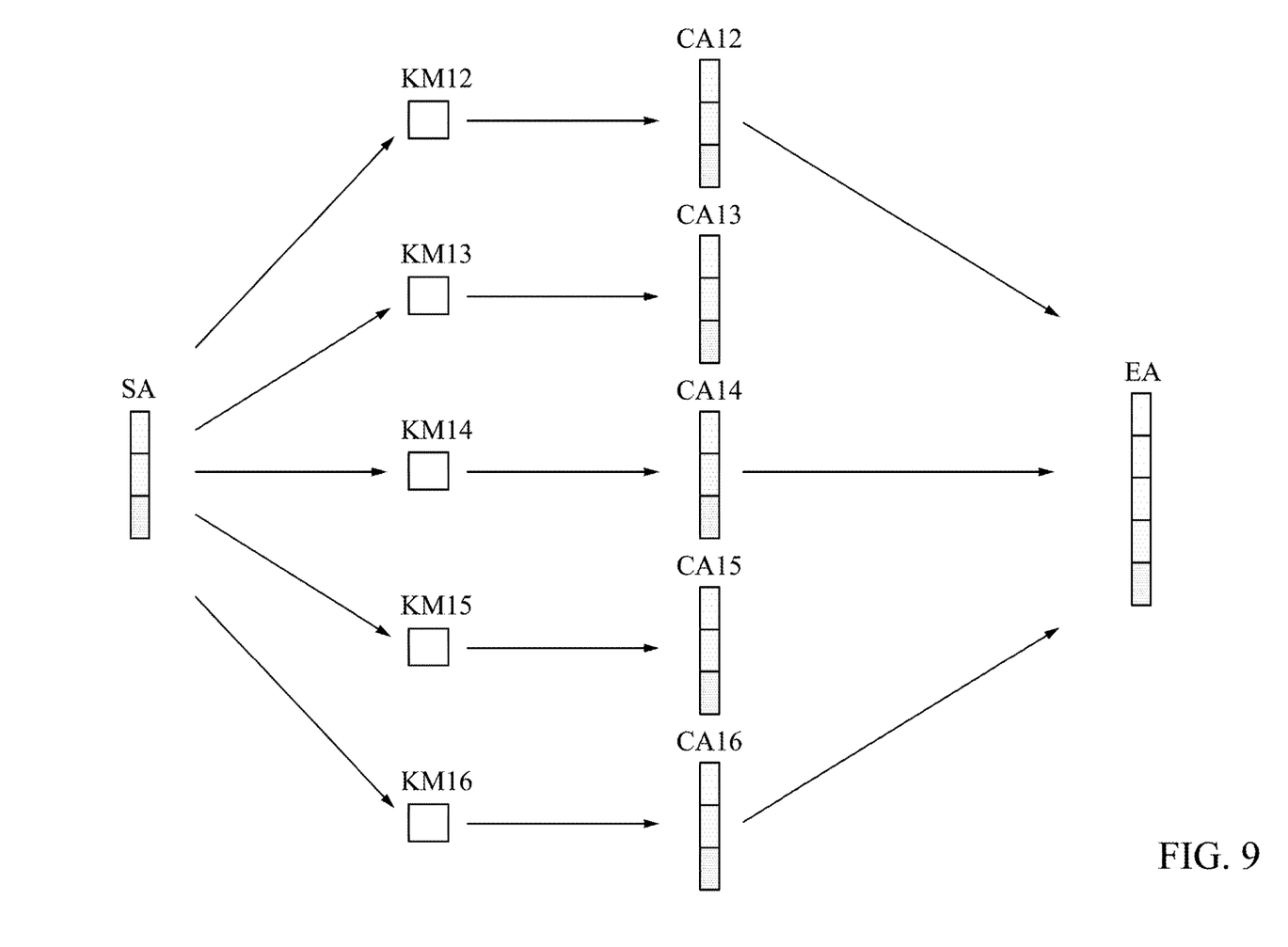
FIG. 9 is a schematic diagram of executing a second excitation convolution network according to some embodiments of the present disclosure.

Further referring to FIG. 9, FIG. 9 is a schematic diagram of executing the second excitation convolution network ECN2 according to some embodiments of the present disclosure. In FIG. 9, the second excitation convolution network ECN2 can receive the squeezed feature array SA from the second squeeze convolution network SCN2. Afterwards, convolution processing can be performed for the squeezed feature array SA by separately using five kernel maps KM12 to KM16 each with a size of 1×1, so as to generate convolution arrays CA12 to CA16.

Afterwards, normalization processing can be performed for the convolution arrays CA12 to CA16 so as to generate an excitation feature array EA. Thus, element-wise product processing can be performed between elements in the excitation feature array EA and the spatial weighted feature maps SFM1 to SFM5, so as to generate multiple enhanced weight feature maps EFM1 to EFM5 (for example, the first element in the excitation feature array EA is multiplied by all elements in the spatial weighted feature map SFM1 to generate the enhanced weight feature map EFM1). Then, the enhanced weight feature maps EFM1 to EFM5 are input to the neural network blocks concatenated after the channel attention model, thus enhancing the spatial weight and the channel weight of the region of interest in the low-resolution in the super-resolution image. In this way, subsequent training (namely, a training phase) or super-resolution processing (namely, a test phase) can be performed in the neural network blocks concatenated after the channel attention model by using the enhanced weight feature maps EFM1 to EFM5.

Figure 10:
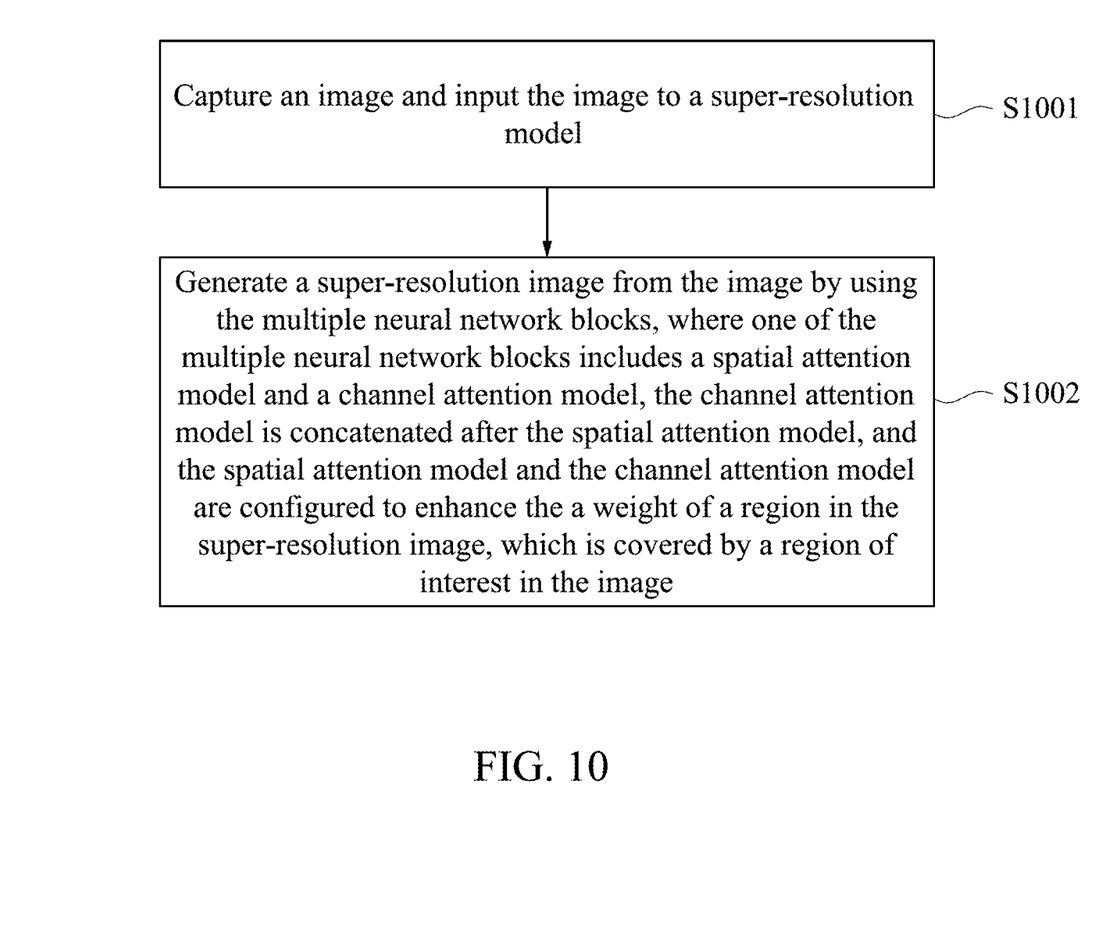
FIG. 10 is a flowchart of an image processing method of the present disclosure.

Referring to FIG. 10, FIG. 10 is a flowchart of an image processing method of the present disclosure. In an embodiment, the image processing method includes steps S1001 to S1002. In step S1001, an image is captured and input to a super-resolution model, where the super-resolution model includes multiple neural network blocks. Afterwards, in step S1002, a super-resolution image is generated from the image by using the multiple neural network blocks, where one of the multiple neural network blocks includes a spatial attention model and a channel attention model, the channel attention model is concatenated after the spatial attention model, and the spatial attention model and the channel attention model are configured to enhance a weight of a region in the super-resolution image, which is covered by a region of interest in the image.

Detailed implementation of the foregoing steps has been described in detail in the foregoing paragraphs, and therefore is not further described herein.

To sum up, the image processing device and method of the present disclosure can use the concatenated spatial attention model and channel attention model in the super-resolution model to enhance the weight of a region of interest in an image in a super-resolution image and to improve a super-pixel processing effect, thus improving an effect of super-pixel processing for the region of interest in the image. In addition, the spatial attention model and the channel attention model further include squeeze and excitation network architectures, thus greatly reducing required computing resources Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. An image processing device, comprising:
   an image capture circuit, configured to capture an image; and
   a processor, connected to the image capture circuit and executing a super-resolution model (SRM), wherein the SRM comprises a plurality of neural network blocks, and the processor is configured to perform the following operations:
      generating a super-resolution image from the image by using the plurality of neural network blocks, wherein one of the plurality of neural network blocks comprises a spatial attention model (SAM) and a channel attention model (CAM), the CAM is concatenated after the SAM, and the SAM and the CAM are configured to enhance a weight of a region in the super-resolution image, which is covered by a region of interest in the image;
   wherein the SAM comprises a first squeeze convolution network, and the operation of enhancing the weight of the region of interest in the image in the super-resolution image comprises:
   receiving a plurality of feature maps from neural network blocks before the SAM; and
   performing squeeze processing for the plurality of feature maps by using the first squeeze convolution network, so as to generate a plurality of squeezed feature maps, wherein the number of the squeezed feature maps is less than that of the feature maps.

2. The image processing device of claim 1, wherein the SAM further comprises a dilated convolution network, and the operation of the SAM enhancing the weight of the region of interest in the image in the super-resolution image comprises:
   performing the feature extraction for the plurality of squeezed feature maps by using the dilated convolution network, so as to generate a plurality of global feature maps; and then enhancing the weight of the region of interest in the image in the super-resolution image according to the global feature maps.

3. The image processing device of claim 2, wherein the operation of performing squeeze processing for the plurality of feature maps by using the first squeeze convolution network so as to generate the plurality of squeezed feature maps comprises:
   performing convolution processing for the feature maps by using a plurality of kernel maps corresponding to the first squeeze convolution network, so as to generate a plurality of convolution images, wherein the number of the kernel maps is less than that of the feature maps; and performing corresponding-element non-linear transformation processing for the plurality of convolution images according to a corresponding relationship between the plurality of kernel maps and the plurality of convolution images, so as to generate the plurality of squeezed feature maps, wherein the squeezed feature maps are respectively correspond to the kernel maps.

4. The image processing device of claim 2, wherein the SAM further comprises a first excitation convolution network, the weight comprises a spatial weighted corresponding to an image space domain of the feature maps, and the operation of the SAM enhancing the weight of the region of interest in the image in the super-resolution image comprises:
performing de-squeeze processing for the plurality of global feature maps by using the first excitation convolution network, so as to generate a plurality of excitation weight maps, wherein the number of the excitation weight maps is equal to that of the plurality of feature maps; and
performing element-wise product processing between the excitation weight maps and the feature maps, so as to generate a plurality of spatial weighted feature maps; and then enhancing the weight of the region of interest in the image in the super-resolution image according to the spatial weighted feature maps.

5. The image processing device of claim 4, wherein the operation of performing de-squeeze processing for the global feature maps by using the first excitation convolution network so as to generate a plurality of excitation weight maps comprises:
performing convolution processing for the global feature maps by using the plurality of kernel maps corresponding to the first excitation convolution network, so as to generate a plurality of convolution images, wherein the number of the kernel maps is greater than that of the global feature maps; and
performing corresponding-element normalization processing for the convolution images according to a corresponding relationship between the kernel maps and the convolution images, wherein the excitation weight maps respectively correspond to the plurality of kernel maps.

6. The image processing device of claim 4, wherein the CAM comprises a global average pooling layer (GAPL), and the operation of the CAM enhancing the weight of the region of interest in the image in the super-resolution image comprises:
receiving the spatial weighted feature maps from the SAM; and
performing channel averaging processing for the spatial weighted feature maps by using the GAPL, so as to generate a feature array; and then enhancing the weight of the region of interest in the image in the super-resolution image according to the feature array.

7. The image processing device of claim 6, wherein the CAM further comprises a second squeeze convolution network, the weights comprise a channel weight corresponding to an image channel domain of the feature maps, and the operation of the CAM enhancing the weight of the region of interest in the image in the super-resolution image comprises:
performing squeeze processing for the feature array by using the second squeeze convolution network, so as to generate a squeezed feature array; and then enhancing the weight of the region of interest in the image in the super-resolution image according to the squeezed feature array, wherein the size of the squeezed feature array is less than that of the feature array.

8. The image processing device of claim 7, wherein the operation of performing squeeze processing for the feature array by using the second squeeze convolution network so as to generate the squeezed feature array comprises:
performing convolution processing for the feature array by using a plurality of kernel maps corresponding to the second squeeze convolution network, so as to generate a plurality of convolution arrays, wherein the number of the kernel maps is less than the number of elements in the feature array; and
performing corresponding-element non-linear transformation processing for the convolution arrays according to a corresponding relationship between the kernel maps and the convolution arrays, so as to generate the squeezed feature array, wherein the elements in the squeezed feature array respectively correspond to the plurality of kernel maps.

9. The image processing device of claim 7, wherein the CAM further comprises a second excitation convolution network, and the operation of the CAM enhancing the weight of the region of interest in the image in the super-resolution image comprises:
performing de-squeeze processing for the squeezed feature array by using the second excitation convolution network, so as to generate an excitation feature array; and
performing scalar product processing between elements in the excitation feature array and the spatial weighted feature maps, so as to generate a plurality of enhanced weight feature maps; and then, enhancing the spatial weighted and the channel weight of the region of interest in the image in the super-resolution image according to the enhanced weight feature maps, wherein the number of the elements in the excitation feature array is equal to the number of the enhanced weight feature maps.

10. The image processing device of claim 9, wherein the operation of performing de-squeeze processing for the squeezed feature array by using the second excitation convolution network so as to generate the excitation feature array comprises:
performing convolution processing for the squeezed feature array by using a plurality of kernel maps corresponding to the second excitation convolution network, so as to generate a plurality of convolution arrays, wherein the number of the kernel maps is greater than the number of elements in the squeezed feature array; and
performing corresponding-element normalization processing for the convolution arrays according to a corresponding relationship between the kernel maps and the convolution arrays, so as to generate the excitation feature array, wherein elements in the excitation feature array respectively correspond to the plurality of kernel maps.

11. An image processing method, comprising:
capturing an image and inputting the image to a super-resolution model (SRM), wherein the SRM comprises a plurality of neural network blocks; and
generating a super-resolution image from the image by using the plurality of neural network blocks, wherein one of the plurality of neural network blocks comprises a spatial attention model (SAM) and a channel attention model (CAM), the CAM is concatenated after the SAM, and the SAM and the CAM are configured to enhance a weight of a region in the super-resolution image, which is covered by a region of interest in the image;

wherein the SAM comprises a first squeeze convolution network, and the operation of the SAM enhancing the weight of the region of interest in the image in the super-resolution image comprises:

receiving a plurality of feature maps from neural network blocks before the SAM; and performing squeeze processing for the feature maps by using the first squeeze convolution network, so as to generate a plurality of squeezed feature maps, wherein the number of the squeezed feature maps is less than that of the feature maps.

12. The image processing method of claim 11, wherein the SAM comprises a dilated convolution network, and the operation of the SAM enhancing the weight of the region of interest in the image in the super-resolution image comprises:

performing the feature extraction for the plurality of squeezed feature maps by using the dilated convolution network, so as to generate a plurality of global feature maps; and then enhancing the weight of the region of interest in the image in the super-resolution image according to the global feature maps.

13. The image processing method of claim 12, wherein the operation of performing squeeze processing for the feature maps by using the first squeeze convolution network so as to generate the plurality of squeezed feature maps comprises:

performing convolution processing for the feature maps by using a plurality of kernel maps corresponding to the first squeeze convolution network, so as to generate a plurality of convolution images, wherein the number of the kernel maps is less than that of the feature maps; and performing corresponding-element non-linear transformation processing for the plurality of convolution images according to a corresponding relationship between the plurality of kernel maps and the plurality of convolution images, so as to generate the plurality of squeezed feature maps, wherein the squeezed feature maps respectively correspond to the kernel maps.

14. The image processing method of claim 12, wherein the SAM further comprises a first excitation convolution network, the weight comprises a spatial weighted corresponding to an image space domain of the feature maps, and the operation of the SAM enhancing the weight of the region of interest in the image in the super-resolution image comprises:

performing de-squeeze processing for the plurality of global feature maps by using the first excitation convolution network, so as to generate a plurality of excitation weight maps, wherein the number of the excitation weight maps is equal to that of the plurality of feature maps; and performing element-wise product processing between the excitation weight maps and the feature maps, so as to generate a plurality of spatial weighted feature maps; and then enhancing the weight of the region of interest in the image in the super-resolution image according to the spatial weighted feature maps.

15. The image processing method of claim 14, wherein the operation of performing de-squeeze processing for the global feature maps by using the first excitation convolution network so as to generate a plurality of excitation weight maps comprises:

performing convolution processing for the global feature maps by using the plurality of kernel maps corresponding to the first excitation convolution network, so as to generate a plurality of convolution images, wherein the number of the kernel maps is greater than that of the global feature maps; and performing corresponding-element normalization processing for the convolution images according to a corresponding relationship between the kernel maps and the convolution images, wherein the excitation weight maps respectively correspond to the plurality of kernel maps.

16. The image processing method of claim 14, wherein the CAM comprises a global average pooling layer (GAPL), and the operation of the CAM enhancing the weight of the region of interest in the image in the super-resolution image comprises:

receiving the spatial weighted feature maps from the SAM; and performing channel averaging processing for the spatial weighted feature maps by using the GAPL, so as to generate a feature array; and then enhancing the weight of the region of interest in the image in the super-resolution image according to the feature array.

17. The image processing method of claim 16, wherein the CAM further comprises a second squeeze convolution network, the weight comprises a channel weight corresponding to an image channel domain of the feature maps, and the operation of the CAM enhancing the weight of the region of interest in the image in the super-resolution image comprises:

performing squeeze processing for the feature array by using the second squeeze convolution network, so as to generate a squeezed feature array; and then enhancing the weight of the region of interest in the image in the super-resolution image according to the squeezed feature array, wherein the size of the squeezed feature array is less than that of the feature array.

18. The image processing method of claim 17, wherein the operation of performing squeeze processing for the feature array by using the second squeeze convolution network so as to generate the squeezed feature array comprises:

performing convolution processing for the feature array by using a plurality of kernel maps corresponding to the second squeeze convolution network, so as to generate a plurality of convolution arrays, wherein the number of the kernel maps is less than the number of elements in the feature array; and performing corresponding-element non-linear transformation processing for the convolution arrays according to a corresponding relationship between the kernel maps and the convolution arrays, so as to generate the squeezed feature array, wherein the elements in the squeezed feature array respectively correspond to the plurality of kernel maps.

19. The image processing method of claim 17, wherein the CAM further comprises a second excitation convolution network, and the operation of the CAM enhancing the weight of the region of interest in the image in the super-resolution image comprises:

performing de-squeeze processing for the squeezed feature array by using the second excitation convolution network, so as to generate an excitation feature array; and performing scalar product processing between elements in the excitation feature array and the spatial weighted feature maps, so as to generate a plurality of enhanced weight feature maps; and then, enhancing the spatial weighted and the channel weight of the region of interest in the image in the super-resolution image according to the enhanced weight feature maps, wherein the number of the elements in the excitation feature array is equal to the number of the enhanced weight feature maps.

20. The image processing method of claim 19, wherein the operation of performing de-squeeze processing for the squeezed feature array by using the second excitation convolution network so as to generate the excitation feature array comprises:

performing convolution processing for the squeezed feature array by using a plurality of kernel maps corresponding to the second excitation convolution network, so as to generate a plurality of convolution arrays, wherein the number of the kernel maps is greater than the number of elements in the squeezed feature array; and performing corresponding-element normalization processing for the convolution arrays according to a corresponding relationship between the kernel maps and the convolution arrays, so as to generate the excitation feature array, wherein elements in the excitation feature array respectively correspond to the plurality of kernel maps.

* * * * *